Patented July 2, 1935

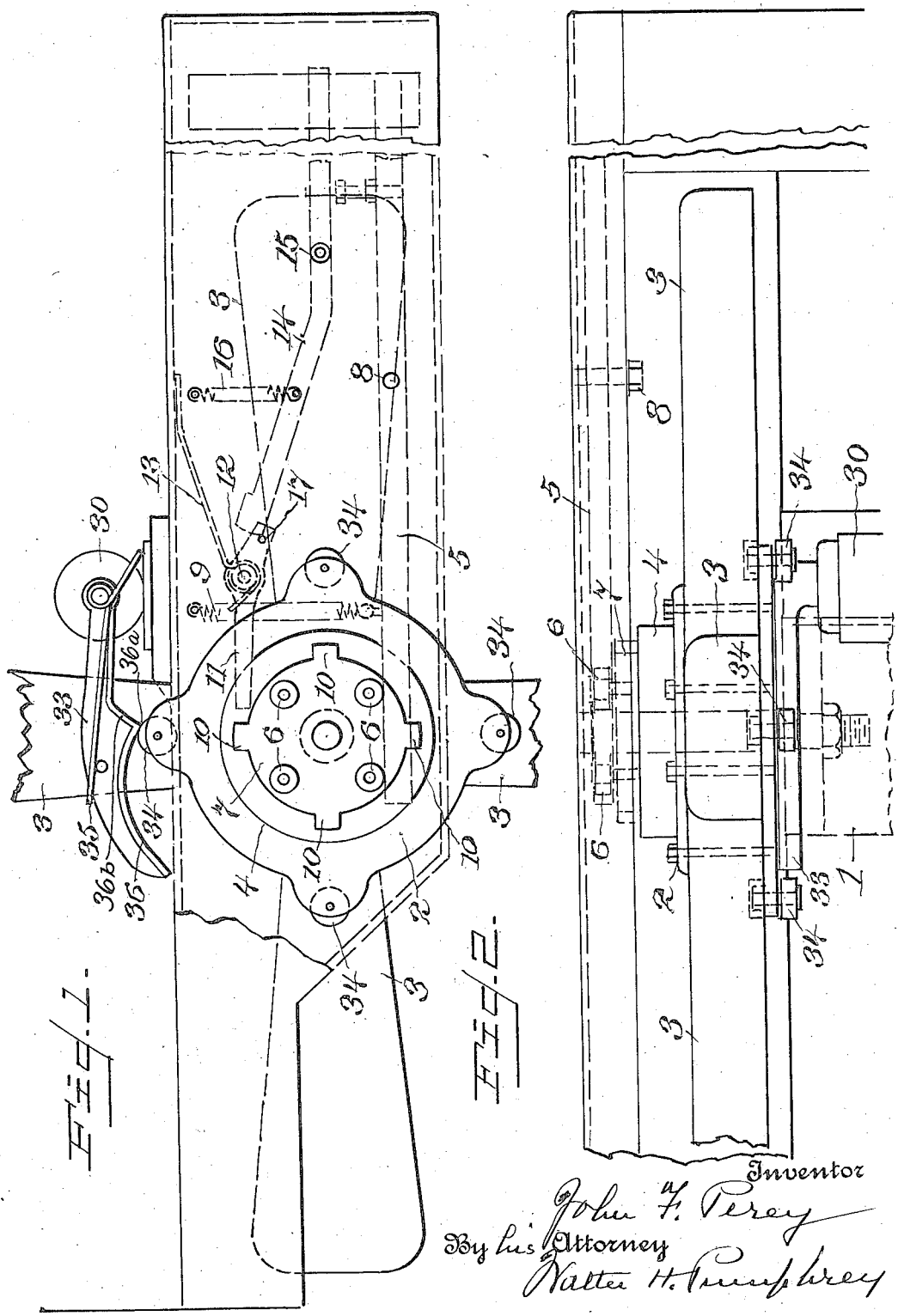

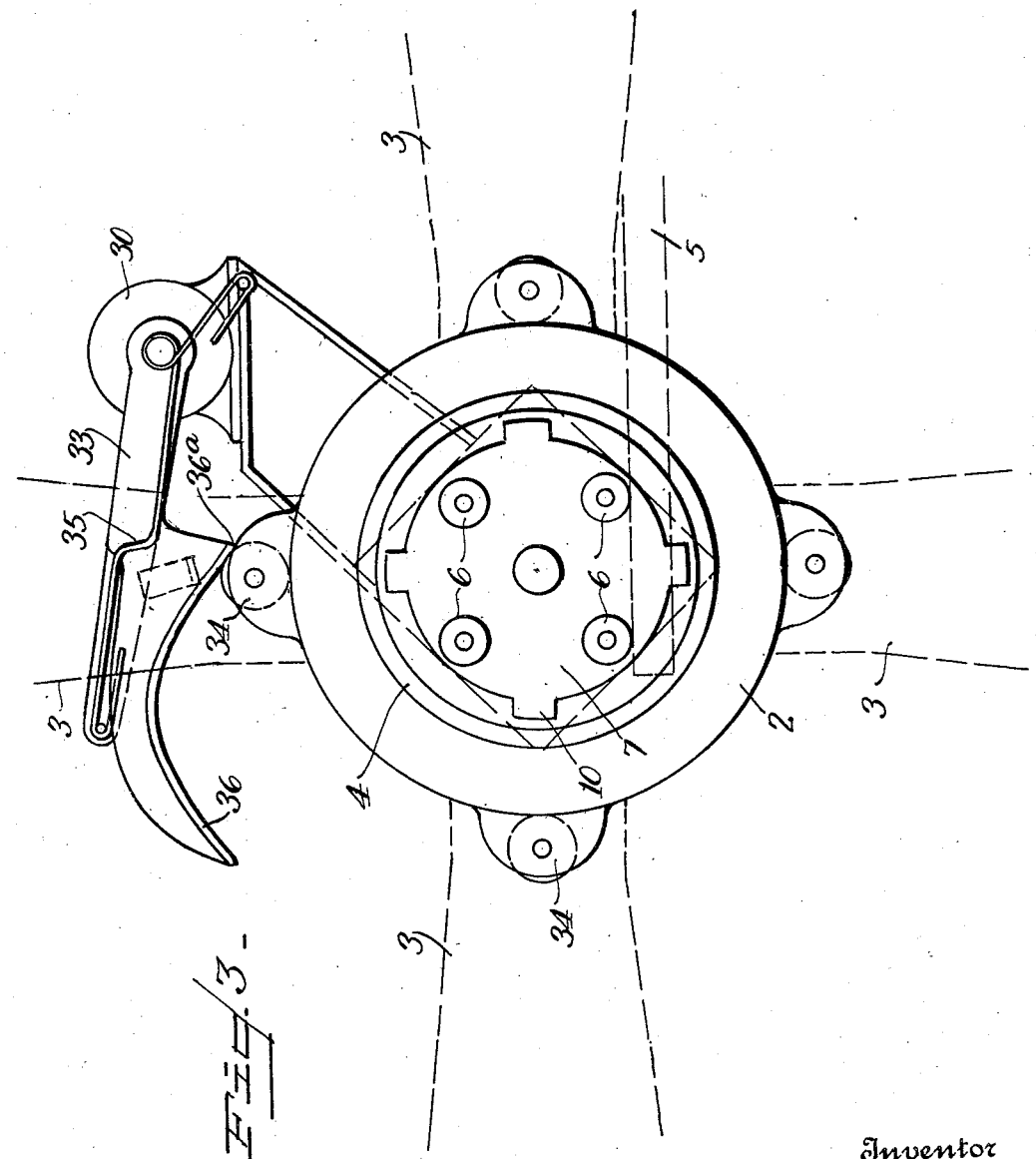

2,007,131

UNITED STATES PATENT OFFICE 2,007,131

TURNSTILE

John F. Perey, Rockville Centre, N. Y., assignor to Perey Manufacturing Company, Inc., New York, N. Y., a corporation of New York Application April 12, 1934, Serial No. 720,211

8 Claims. (Cl. 39—3)

This invention relates generally to turnstiles, gates and like passage-controlling barriers and has for its object to cause such barriers to operate silently. To this end provision is made for bringing the barriers to a comparatively easy stop, which, in addition to doing away with noise objectionable to passing patrons and others nearby, avoids injurious shock to the barrier mechanism.

As it is necessary to give a turnstile a sturdy, rugged structure, to enable it to withstand the rough treatment to which it is ordinarily subjected in use, the problem of practically easing the turnstile to a noiseless stop, presents many serious difficulties.

Stops and brakes of various kinds have been applied to turnstiles in an effort to solve the problem but have been unsatisfactory, owing to failure to meet the requirements insisted upon by transportation companies and other large users of turnstiles.

Aside from the main requirement of silent operation, the brake must not only be capable of bringing the barrier to a quick, easy stop, regardless of its momentum, but must furthermore check any tendency of the barrier to vibrate or oscillate on reaching its home position, as any such action would be highly objectionable in causing confusion and delay in operation and subjecting patrons attempting to pass the barrier to risks of serious injury.

The brake must also be of comparatively simple and inexpensive construction and employ a minimum number of parts, to insure long life in good working condition, without requiring readjustment, repair or replacement, as any interruption of or withdrawal from service causes serious embarrassment to the operating company and its patrons, particularly in busy locations where hundreds of people crowd through the turnstile-controlled passages during rush hours.

To meet the above and other requirements, I employ a brake of the hydraulic type which is silent in operation and entirely capable of rapidly reducing the momentum of the turnstile barrier and bringing it to a stop without shock or jar to the turnstile mechanism.

Such a brake is automatic in its action and is preferably so constructed and arranged that its power increases to the maximum, as the turnstile barrier reaches its home position and completes its operation. I have found that by maintaining the brake applied until the beginning of the next operation of the turnstile, any tendency of the barrier to oscillate, as it is brought to a stop, is effectively checked and the turnstile is thereby made immediately available for further operation without delay or danger to passing patrons.

To insure a smooth, easy application and release of the brake, I preferably employ a simple cam action, the operation of which is gradual, comparatively speaking, and free of noise-producing shocks or jars.

By forming the cam on or in part with the brake-actuating lever, a single member is thus made to serve with a turnstile barrier of any number of arms, it being necessary only to provide each barrier arm with a stud or roller to cooperate with the cam-faced brake-actuating lever.

In the accompanying drawings, I have shown one form of mechanism suitable for carrying my invention into effect but do not wish to be understood as intending to limit myself to the same as various changes may be made therein without departing from the spirit and scope of the invention, as outlined in the appended claims.

In the drawings:

Fig. 1 is a top plan view of a turnstile with my invention shown applied, portions of the casing being omitted to more clearly show the mechanism, and Fig. 2 is a view in side elevation thereof.

Fig. 3 is a top plan view of a modification, with certain parts omitted.

Referring now to the drawings, 1 represents a standard, which serves as the supporting pedestal of the turnstile.

Rotatably mounted in suitable bearings of the standard, there is an armed barrier 2. The usual four armed type is shown, but it will be understood that a barrier having a greater or less number of arms may be employed, if desired. The arms 3, of the barrier project radially from and are equi-spaced about a central hub or head 4.

Normally, or when the turnstile is not in operation, the barrier is yieldingly held by a positioning lever 5, with one of its arms across and barring entrance through the passage the turnstile is intended to control. The positioning lever cooperates in the usual manner with a pair of rollers 6, 6, carried by a disk 7, secured to and rotating with the barrier head, above referred to; there being four of such rollers equi-spaced about the turning axis of the head. The positioning lever 5 is pivoted at 8, and is yieldingly held under pressure against the rollers by means of heavy spring 9.

The turnstile shown is of the well known type which requires the insertion of a coin to release it for operation. The coin released lock consists of four lugs or projections 10, 10, etc., which are formed in part with the disk 7, and cooperating with the lugs there is a barrier locking pawl 11, pivoted at 12, and yieldingly held in engaging relation with the lugs by a spring 13.

A coin-actuated release lever for the locking pawl is shown at 14. This lever has limited movement about a pivot, 15, and, under the action of a spring 16, the free end of the lever co-acts with a pin or stud 17 on the locking pawl to disengage the latter and free the turnstile barrier for operation.

The usual provision is made, by normally spacing the engaging end of the locking pawl and the disk locking lug, next in line for engagement, somewhat apart, to permit the necessary free limited movement of the turnstile barrier to operate a coin finder carried by the positioning lever 5, the details of which will not be given, as the device is well known in the art and forms no part of the present invention.

In operation of the mechanism thus far described, the free movement of the barrier is sufficient to give the necessary motion to the positioning lever 5, to swing it about its pivot and advance a coin finder pin or slide carried thereby, through the coin chute. If there is no coin in the chute, the turnstile remains locked and the heavy spring 9, reacting through the positioning lever 5 and rollers 6, 6, etc., returns the rotating barrier to its normal position—shown in Fig. 1. If, on the other hand, a coin is present in the chute, the coin finder engages it and by giving the coin motion transversely of the chute, causes it to engage and give motion to the release lever 14. The latter, coacting with the pin or stud 17, swings the locking pawl 11 clear of the lug 10 of the disk 7 and frees the barrier for a complete operation. The release of the coin is subsequently brought about in a well known manner and therefore need not be described.

It will be understood that the above described turnstile is conveniently employed here for purposes of illustration only, to aid in showing the application of my improved brake, to be hereinafter more fully described, and may therefore be replaced by any other type or form preferred, as the brake is designed to coact with the turnstile barrier only and has no cooperative relation with any other part or element of the mechanism.

Before describing the brake at greater length, I want first to make clear that the solution of the problem of easing the turnstile barrier to a noiseless stop is not found in a brake device of the type now in common use as a door check and an automobile shock absorber.

As such devices are constructed and applied to a door or automobile, the actuating lever thereof is permanently linked to the door frame or automobile axle frame and, thus restricted, cooperates with one member only, whereas for a turnstile, the actuating lever of the brake must be free to enable it to coact successively with each of the several arms of the barrier.

The brake-actuating lever being thus left free for successive cooperation with the barrier arms of the turnstile, it is necessary to provide suitable means for bringing about proper timed engagement and properly regulated and controlled movement after engagement, both for the application of the brake and its release and return to normal position, preparatory to the next operation. These are essential requirements peculiar to an effective and satisfactory turnstile brake and distinguish it from the door check and automobile shock absorber, in which such needs are not present.

Another distinguishing feature is the necessity in a turnstile brake for eliminating vibration or oscillation of the barrier as it reaches its home position. No provision for this purpose is made in either a door check or an automobile shock absorber. The action of the spring latch of the ordinary door lock prevents vibration of the door and makes the provision unnecessary and in the automobile shock absorber, such vibration is not seriously objectionable and is considered negligible.

Recognizing, as the foregoing makes apparent, that the ordinary door check or shock absorber would not meet essential requirements of a turnstile brake unless modified, I employ a construction, in which the brake cylinder 30, is mounted on the turnstile standard or an extension thereof, in such position that the brake-actuating lever 33 attached to the piston, projects into the path of travel of a stud, roller or the like 34, attached to the under side of each of the barrier arms 3. The brake-actuating lever 33 is yieldingly held thus advanced by a spring 35, which also serves to return the lever to normal position after each application of the brake.

In Fig. 1, the cam 36, of the brake-actuating lever, is formed beyond the high point, indicated at 36ª, to present an inclined surface 36ᵇ, to the engaging roller 34 of the barrier and so cause the brake-actuating lever to be gradually returned by its spring to its normal position, preparatory to the next operation of the turnstile.

If quicker resetting action of the brake is desired, it may be obtained by shaping the cam face of the brake-actuating lever as shown in the Fig. 3 modification, in which the cam terminates at the high point 36ª, the inclined surface 36ᵇ, of the Fig. 1 form being omitted to permit instant return of the lever as the barrier roller passes the high point of the cam.

The timing of the action of the brake is effected by extending the lever 33 more or less into the path of travel of the barrier arm rollers for engagement therewith at any predetermined point desired.

The regulation of the brake, in its application, is controlled by a cam 36, formed in part, with the lever 33, for cooperation with the barrier arm rollers 34.

The form of the cam is such that the brake is appplied gradually, its power increasing as the barrier nears its home position, the effect of which is to reduce the momentum of the barrier and bring it to an easy, noiseless stop.

As the barrier reaches its home position, completing an operation, the barrier arm roller engaging the cam, comes to rest just short of the high point of the cam, as shown in Fig. 1, and is maintained thus until the beginning of the next operation.

The brake-actuating lever not being fully thrown by the cam, sufficient brake power remains available to check any tendency of the barrier to oscillate and as a result, it may be put into immediate operation again, no time interval being required between the completion of one operation and the beginning of the next.

At the beginning of the next operation, the first movement of the barrier carries the roller engaging the cam over the high point thereof and on to the adjoining descending portion and through the action of the spring 35, in retracting the brake-actuating arm, it is returned to its normal position for again being actuated to apply the brake, as the barrier reaches a predetermined point in its travel.

Having thus described my invention, what I claim is:

1. A one-way turnstile combining a standard, an armed barrier rotatably mounted thereon, means to prevent rotation of the barrier in one direction, an hydraulic shock absorber supported by said standard and provided with an actuating arm, a suitable engaging device carried by each arm of said barrier and adapted successively to shift said actuating arm from an initial position as said barrier approaches the home positions thereby to cause said shock absorber to overcome the momentum of said barrier, and a spring active during the rotation of said barrier to return said actuating arm to its initial position.

2. A one-way turnstile combining a standard, an armed barrier rotatably mounted thereon, means to prevent rotation of the barrier in one direction, an hydraulic shock absorber supported by said standard and provided with a spring-retracted actuating arm, a suitable engaging device carried by each arm of said barrier and adapted successively to shift said actuating arm from an initial position as said barrier approaches its home positions thereby to cause said shock absorber to overcome the momentum of said barrier.

3. A turnstile combining a standard, an armed barrier rotatably mounted thereon, an hydraulic shock absorber provided with a spring-retracted actuating arm, and a suitable engaging device carried by each arm of said barrier and adapted successively to shift said actuating arm from an initial position as said barrier approaches its home positions thereby to cause said shock absorber to overcome the momentum of said barrier.

4. A turnstile combining a standard, an armed barrier rotatably mounted thereon and provided with suitable engaging devices corresponding in number and spacing with the arms of the barrier, an hydraulic shock absorber, and a spring-retracted actuating arm for the shock absorber, the said arm being cam-faced to cause it, in cooperation with each of said barrier-engaging devices, to be moved away from its initial position to check the momentum of the barrier and thereafter returned to its initial position through the action of its spring.

5. A turnstile combining a standard, an armed barrier rotatably mounted thereon and provided with engaging rollers corresponding in number and spacing with the arms of the barrier, an hydraulic shock absorber and a spring-retracted actuating arm for the shock absorber, having a cam face of such shape as to cause said arm, in cooperation with each of said barrier rollers, to be moved away from its initial position to check the momentum of the barrier, and thereafter gradually returned to its initial position by the action of its spring.

6. A turnstile combining a standard, an armed barrier rotatably mounted thereon and provided with engaging rollers corresponding in number and spacing with the arms of the barrier, an hydraulic shock absorber, a spring-retracted actuating arm for the shock absorber having a cam face of such shape as to cause said arm, in cooperation with each of said barrier rollers, to be moved away from its initial position to check the momentum of the barrier as the turnstile nears the end of its operation and returned to its initial position at the beginning of the next operation by the action of its spring.

7. A turnstile combining a standard, an armed barrier rotatably mounted thereon and provided with engaging rollers corresponding in number and spacing with the arms of the barrier, an hydraulic shock absorber, and a spring-retracted actuating arm for the shock absorber having a cam face, a portion of which is so shaped as to cause said arm, in cooperation with each of said barrier rollers, to be moved away from its initial position to a point approaching the full throw of the cam to check the momentum and prevent oscillation of the barrier as the turnstile completes its operation, the form of the remaining portion of the cam being such as to permit the arm to be returned to its initial position under the action of its spring.

8. A turnstile combining a standard, an armed barrier rotatably mounted thereon and provided with engaging rollers corresponding in number and spacing with the arms of the barrier, a silently operating shock absorber, and a spring-retracted actuating arm for the shock absorber having a cam face, a portion of which is so shaped as to cause said arm, in cooperation with each of said barrier rollers, to be moved away from its initial position to a point approaching the full throw of the cam to check the momentum and prevent oscillation of the barrier as the turnstile completes its operation, the form of the remaining portion of the cam being such as to permit the arm to be returned to its initial position under the action of its spring.

JOHN F. PEREY.